United States Patent
Ung et al.

(10) Patent No.: US 6,782,258 B2
(45) Date of Patent: Aug. 24, 2004

(54) WIRELESS HOT-LINING WITH AUTOMATICALLY ASSIGNED VARIABLE HOT-LINE NUMBER

(75) Inventors: Dara Ung, Odenton, MD (US); Mark Titus, Arnold, MD (US); Robert T. Calabrese, Naperville, IL (US); Margaret S. Shepard, Annapolis, MD (US); Karl Lebedda, Baltimore, MD (US); Carle S. Johnson, Jr., Annapolis, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 547 days.

(21) Appl. No.: 09/836,469

(22) Filed: Apr. 18, 2001

(65) Prior Publication Data

US 2002/0025809 A1 Feb. 28, 2002

Related U.S. Application Data (60) Provisional application No. 60/197,808, filed on Apr. 18, 2000.

(51) Int. Cl.$^7$ ................................................ H04Q 7/20
(52) U.S. Cl. ................................. 455/432.1; 455/435.1
(58) Field of Search .......................... 455/432.3, 414.1, 455/422.1, 433, 432.1, 435.1, 461, 435.2, 459

(56) References Cited

U.S. PATENT DOCUMENTS

| | | | |
|---|---|---|---|
| 5,239,570 A | 8/1993 | Koster et al. .................. 379/45 |
| 5,341,410 A | * 8/1994 | Aron et al. .................. 455/410 |
| 5,592,535 A | 1/1997 | Klotz | |
| 5,628,051 A | 5/1997 | Salin .......................... 455/466 |
| 5,682,600 A | 10/1997 | Salin ........................ 455/422.1 |
| 5,768,509 A | 6/1998 | Gunluk | |
| 5,787,357 A | 7/1998 | Salin .......................... 455/433 |
| 5,793,859 A | * 8/1998 | Matthews ............... 379/211.03 |
| 5,797,094 A | 8/1998 | Houde et al. | |
| 5,828,740 A | 10/1998 | Khuc et al. | |
| 5,953,398 A | 9/1999 | Hill | |
| 5,999,811 A | 12/1999 | Molne | |
| 6,070,067 A | 5/2000 | Nguyen et al. | |
| 6,122,510 A | * 9/2000 | Granberg ..................... 455/433 |
| 6,148,198 A | 11/2000 | Anderson et al. | |
| 6,157,831 A | * 12/2000 | Lamb .......................... 455/433 |
| 6,192,241 B1 | * 2/2001 | Yu et al. ....................... 455/433 |
| 6,490,450 B1 | * 12/2002 | Batni et al. .................. 455/433 |
| 6,529,732 B1 | * 3/2003 | Vainiomaki et al. ......... 455/433 |
| 6,587,688 B1 | * 7/2003 | Chambers et al. .......... 455/433 |

FOREIGN PATENT DOCUMENTS

| | | | | |
|---|---|---|---|---|
| EP | 0 851 703 A2 | * | 7/1998 | ............. H04Q/7/38 |
| EP | 1 263 245 A2 | * | 12/2002 | ............. H04Q/3/00 |
| WO | WO 00/32004 A1 | * | 6/2000 | ............. H04Q/7/38 |

* cited by examiner

Primary Examiner—Charles Appiah
(74) Attorney, Agent, or Firm—William H. Bollman (57) ABSTRACT

A technique and architecture that enables a Service Provider (SP) to hot-line a roaming WIN subscriber (e.g., a prepaid subscriber) to a closest WIN platform via a Least Cost Network (LCN), depending on the location, and optionally, on the time of a call from a roaming subscriber. Importantly, the present invention allows a service provider to significantly reduce the cost of routing a long distance call when the subscriber roams outside the service provider's network. A service provider may automatically provide one of a plurality of hot-line numbers to a roaming subscriber (e.g., a prepaid subscriber) of a wireless network (e.g., a Wireless Intelligent Network (WIN)) associated with a desired wireless network platform (e.g., a closest WIN platform, e.g., service node (SN), service control point (SCP), etc.) via a LCN. The LCN can be, e.g., an SS7 network, a PSTN, a TCP/IP (Internet), or dedicated trunks.

14 Claims, 7 Drawing Sheets

Variable Hot-lining in a Roaming Network

FIG. 1

Hot- Line Number
Lookup Table

| MSC ID | Hot- Line Telephone # | |
|---|---|---|
| VMSC 1 | 800-555-1234    (LCN 1) | 102 |
| VMSC 2 | 800-555-4321    (LCN 2) | 104 |
| VMSC 3 | 888-555-1000    (LCN 3) | 106 |
| ... | ... | |

Hot-Line Number Lookup Table with TOD

| MSC ID | Hot-Line Telephone # | Time of Day | |
|---|---|---|---|
| VMSC 1 | 800-555-1234 | 9 AM to 5 PM | 112 |
| VMSC 1 | 888-555-1000 | 5:01 PM to 8:59 AM | 113 |
| VMSC 2 | 800-555-4321 | — | 114 |
| VMSC 3 | 888-555-1000 | — | 116 |
| ... | ... | ... | 100 |

WIRELESS HOT-LINING WITH AUTOMATICALLY ASSIGNED VARIABLE HOT-LINE NUMBER

This application claims priority from U.S. Provisional Application 60/197,808, filed Apr. 18, 2000, entitled "Wireless Least Cost Hot-Lining", to Dara Ung, Mark Titus, Robert T. Calabrese, Margaret S. Shepard, Karl Lebedda, and Carle S. Johnson, Jr., the entirety of which is expressly incorporated herein by reference.

BACKGROUND OF THE INVENTION

1. Field of the Invention

This invention relates generally to wireless and long distance carriers, Internet service providers (ISPs), and information content delivery servicesIproviders and long distance carriers. More particularly, it relates to Wireless TeleCommunication, ANSI-41 Automatic Registration applications, and hot-lining applications.

2. Background of Related Art

In recent years, the telecommunication industry has seen an explosive growth both in the number of the types of wireless services offered and in the number of wireless service providers. Among those numerous services now being offered, prepaid call service may be one of the fastest growing segments in the telecommunication industry today.

Whether prepaid or postpaid, wireless services in general, and prepaid call services in particular, often make use of a feature referred to as "hot-lining". Hot-lining routes a telephone call request from a mobile device to a particular telephone number no matter what telephone number was dialed by the mobile device.

In prepaid applications, hot-lining is particularly important, e.g., to allow real-time rating of the desired telephone call by the home service provider. For instance, once hot-lined to a common telephone number, the service provider may audibly prompt the mobile device from the common telephone number for a mobile identification number (MIN), personal identification number (PIN), etc.

Another example of hot-lining in prepaid applications may be to direct a subscriber to a telephone number of a pre-recorded message after their prepaid account has been drawn down to the point that it reflects insufficient prepaid funds remaining.

As yet another example, hot-lining may be used to simplify the initial provisioning of a new mobile device. For instance, any first call from a new mobile telephone may be directed to an operator who will assist the new subscriber in provisioning their mobile telephone.

Hot-lining is conventionally defined in an applicable wireless telephone standard, commonly referred to as IS-41. The conventional IS-41 hot-lining feature allows the designation of one hot-line telephone number. All originating calls that are to be hot-lined must be routed using this designated telephone number.

Convention hot-line numbers are fixed, i.e., cannot be changed automatically. When a wireless call is to be hot-lined, it is conventionally routed based on the pre-designated hot-line telephone number provisioned in the home location register (HLR) for that particular mobile subscriber. When the subscriber roams to a network that is outside the home network, call origination placed by that subscriber is routed over long distance carriers back to the home network, then allowing the hot-lining to proceed based on the subscriber's service provider's pre-designation of a hot-line telephone number for that subscriber.

While serving a very useful purpose, conventional hot-lining systems and techniques tend to be costly for a mobile subscriber, particularly when they roam far from the wireless intelligent network (WIN) or call center of their wireless service provider.

There is a need for an improved technique and architecture which provides a lower cost hot-lining solution, particularly with respect to wireless devices when they roam far from the location of their WIN platform or call center.

SUMMARY OF THE INVENTION

In accordance with the principles of the present invention, a WIN application in a wireless intelligent network includes a hot-line lookup table comprising a plurality of entries. Each of the entries associating a service providing messaging service center ID with at least one particular hot-line telephone number. The service providing messaging service center is associated with a roaming mobile station visiting a messaging service center in the wireless intelligent network.

A method of automatically assigning one of a plurality of hot-line numbers to an incoming call from roaming mobile device in accordance with another aspect of the present invention comprises forwarding a REGNOT message from a home location register associated with the roaming mobile device to an application running on a wireless intelligent network (WIN) platform. A unique identification of a home wireless intelligent network of the roaming mobile device is retrieved. One of a plurality of different hot-line numbers is selected based on a match to the unique identification of the home wireless intelligent network.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a technique and architecture that enables a Service Provider (SP) to hot-line a roaming WIN subscriber (e.g., a prepaid subscriber) to a closest WIN platform via a Least Cost Network (LCN), depending on the location, and optionally, on the time of a call from a roaming subscriber. Importantly, the present invention allows a service provider to significantly reduce the cost of routing a long distance call when the subscriber roams outside the service provider's network.

The principles of the present invention have applicability particularly with respect to wireless intelligent network (WIN) applications. In accordance with the principles of the present invention, a service provider may automatically provide one of a plurality of hot-line numbers to a roaming subscriber (e.g., a prepaid subscriber) of a wireless network (e.g., a Wireless Intelligent Network (WIN)) associated with a desired wireless network platform (e.g., a closest WIN platform, e.g., service node (SN), service control point (SCP), etc.) via a LCN. The LCN can be, e.g., an SS7 network, a PSTN, a TCP/IP (Internet), or dedicated trunks.

Figure 1:
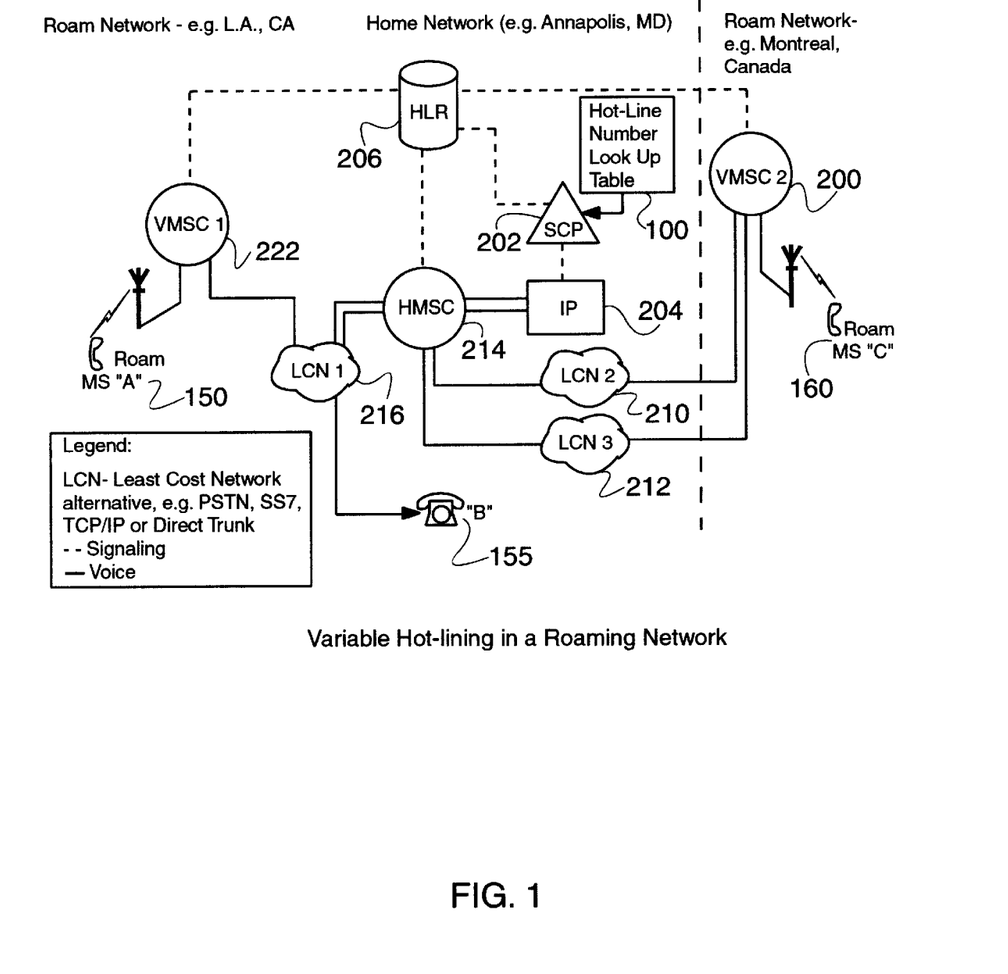
FIG. 1 shows an exemplary architecture of a variable telephone number cost hot-lining in a roaming network, using techniques and apparatus in accordance with the principles of the present invention.

FIG. 1 shows an exemplary architecture of a variable telephone number cost hot-lining in a roaming network, using techniques and apparatus in accordance with the principles of the present invention.

In particular, as shown in FIG. 1, a mobile device 150 is roaming, and being serviced initially by a visiting MSC (VMSC1) 222. The subscriber's home network includes a home location register 206, a home MSC (HMSC) 214, an IP interface 204, and a service control point (SCP) 202.

Importantly, the variable telephone number cost hot-lining network architecture includes a hot-line number lookup table 100, shown in the embodiment of FIG. 1 in communication with the SCP 202 application.

Thus, in accordance with the principles of the present invention, the WIN application of the SCP 202 of the serving provider (e.g., the provider contacted initially when roaming) preferably contains a hot-line lookup table 100 comprising the identification of the serving messaging service center (MSCID), and a preferred hot-line telephone number based on predetermined rules (e.g., the identity of the serving provider, the relative distance to the home service provider, time of day, etc.) For instance, the hot-line telephone number in the table may be determined based on a "closest" and/or "least expensive call" basis. The hot-line telephone numbers in the hot-line lookup table 100 are preferably provisionable at service deployment.

As shown in FIG. 1, when the mobile device "A" 150 calls subscriber "B" 155 while roaming in Los Angeles, the call is automatically hot-lined to the subscriber's home network based on the MSCID of "VMSC1" at any time over the network LCN1.

As another example, when mobile device "C" 160 calls subscriber "B" 155 during a first time interval while roaming in Montreal, the call is hot-lined over LCN2 to the home network. However, when the mobile device "C" 160 calls during a second time interval, the call will instead be automatically hot-lined using LCN3.

Note that to have accurate time information, it is preferred that small intervals of periodic registrations be provisioned in the hot-line number lookup table 100.

Figure 2A:
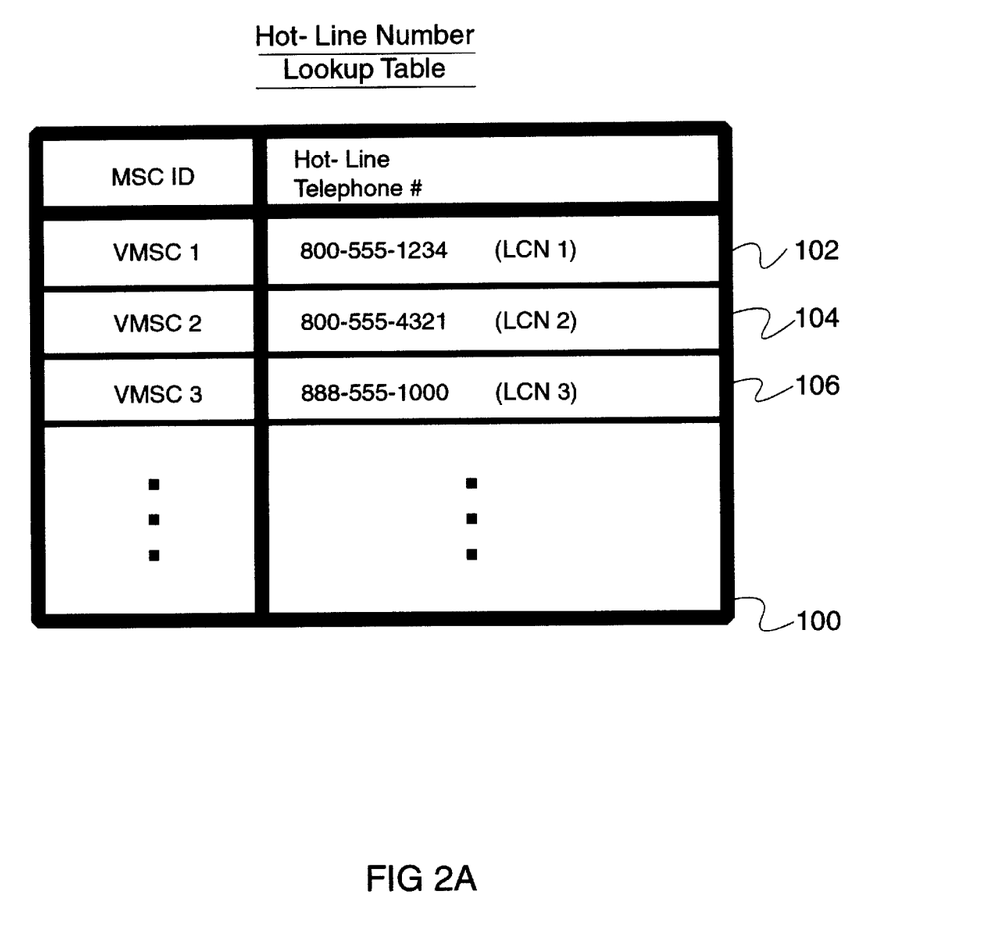
FIG. 2A shows an exemplary hot-line number lookup table as shown in FIG. 1.

FIG. 2A shows an exemplary hot-line number lookup table as shown in FIG. 1.

In particular, as shown in FIG. 2A, the exemplary hot-line number lookup table 100 includes a plurality of entries 102–106. Each entry 102–106 associates a particular home MSC with a preferred hot-line number.

For instance, the first entry 102 associates a particular subscriber's visiting or roaming MSC (VMSC1) with a first hot-line number (e.g., 800-555-1234, referred to in FIG. 1 as "LCN1"). As a result, when a subscriber attempts to contact the relevant WIN whose home network includes VMSC1 as part of the look-up table, it will be hot-lined to 800-555-1234.

Similarly, the second entry 104 associates the hot-line number 800-555-4321 with subscribers roaming or visiting an MSC identified by "VMSC2". (Note that the references such as VMSC2, etc. are used for exemplary purposes only: Actual identification of MSCs will be quite different.) The third entry 106 associates the hot line number 888-555-1000 with subscribers providing an MSCID of "VMSC3".

The entries 102–106 are preferably established by the service provider, but may be remotely configurable, e.g., by the user as desired. For instance, different calling plans may provide for different hot-lining numbers.

Figure 2B:
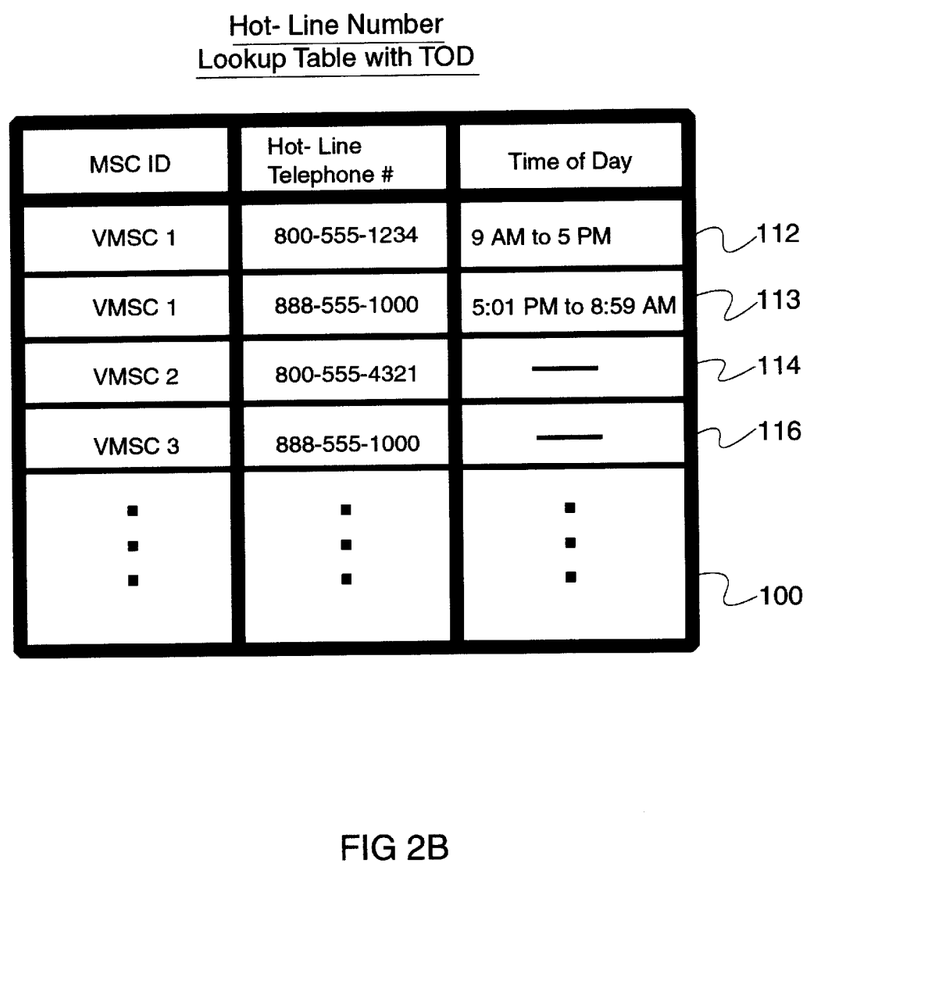
FIG. 2B shows another exemplary hot-line number lookup table as shown in FIG. 1, including an additional feature of the time of day of the incoming call to further automatically assign a hot-line telephone number, in accordance with the principles of the present invention.

FIG. 2B shows another exemplary hot-line number lookup table as shown in FIG. 1, including an additional feature of the time of day of the incoming call to further automatically assign a hot-line telephone number, in accordance with the principles of the present invention.

In particular, as shown in FIG. 2B, additional parameters may be added to one or more entries in the hot-line number lookup table 100. For instance, a time of day (TOD) parameter may be added such that subscriber's from a particular roaming wireless network may be hot-lined to one telephone number when a call is initiated during certain hours of the day, and to another telephone number during the other hours of the day. Of course, this may be expanded to provide more than two time slots and more than two hot-line numbers for any particular home wireless network.

In a first entry 112, subscriber's with an MSCID of "VMSC1" will be automatically hot-lined to 800-555-1234 when a call is initiated between 9 AM and 5 PM, and to 888-555-1000 when a call is initiated otherwise. From the same roamed to network, a subscriber with an MSCID of "VMSC2" will always be automatically hot-lined to 800-555-4321.

The time of day parameter in FIG. 2B is provided by way of example only. Additional parameters may be provided in the hot-line number lookup table 100. For instance, one or all entries in the hot-line number lookup table 100 may include the time of the call, directing the use of different hot-line telephone numbers chosen not only on the MSCID of the contacting subscriber's mobile device, but also on the time of day of the incoming call. Actual additional parameters may be one or more other restrictions, e.g., a day of the week, a month of the year, whether a prepaid or postpaid subscriber, etc.

In accordance with the principles of the present invention, a Registration Notification message is forwarded from a relevant Home Location Register (HLR) to the wireless intelligent network (WIN) platform of the subscriber's service provider when the subscriber registers with it their mobile station (MS) or mobile device. Such a trigger indicating mobile registration forwards a registration notification message (REGNOT) over an IS-41 communication path to the subscriber's WIN platform whenever the subscriber registers with their mobile device.

One example of such a suitable registration notification message is a Mobile Registration Trigger (MRT) provided by equipment provided by LUCENT TECHNOLOGIES in Murray Hill, N.J.

For simplicity, it is assumed in the given embodiments that the contacted Service Provider (SP) has already provisioned a table or other type database in the hot-line number lookup table 100 with the subscriber's MSCID, and that the associated hot-line number(s) are provided in the form of NPA-NXX-XXXX.

Activation of OI-8: Option 1

Figure 3:
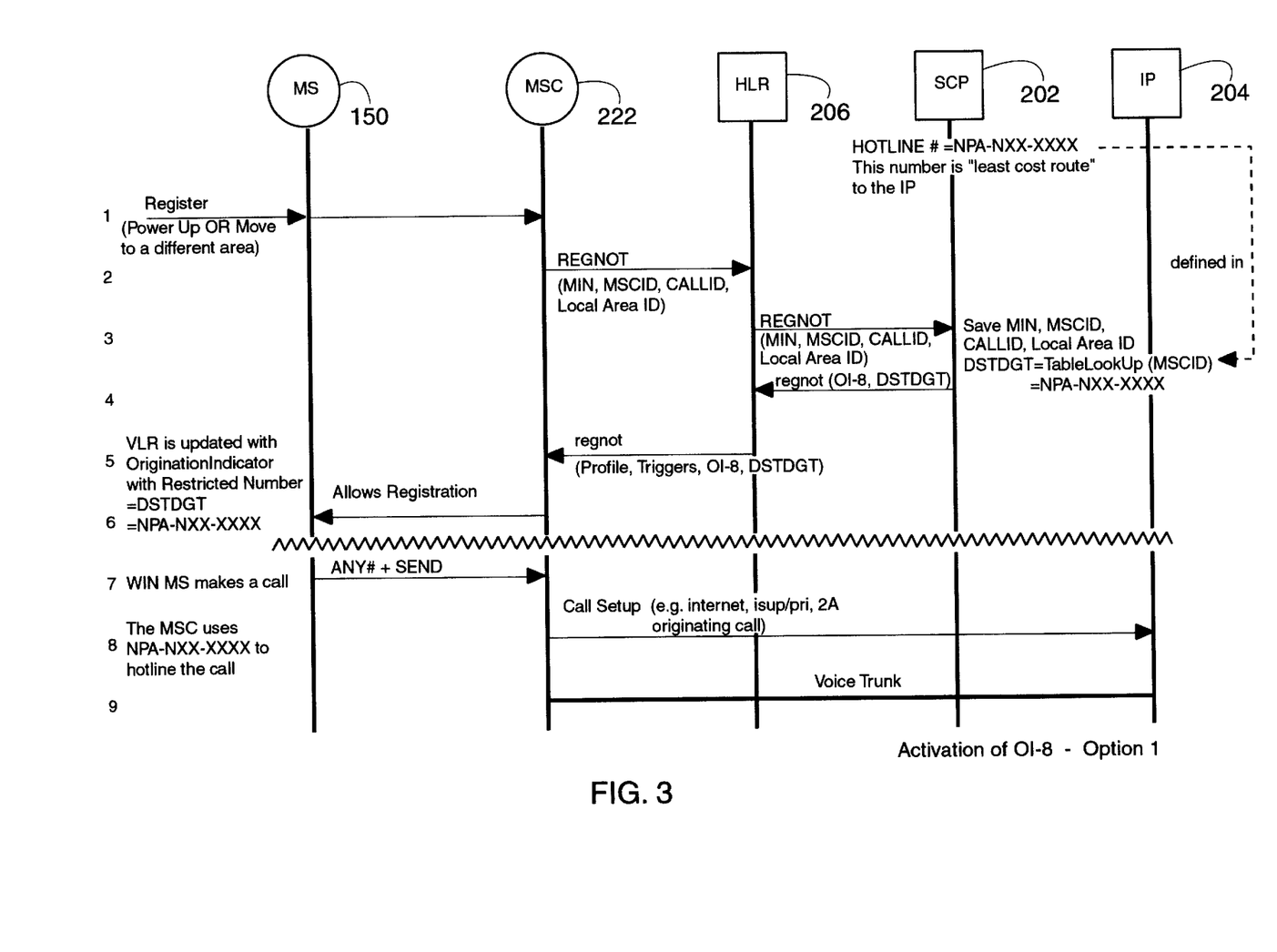
FIG. 3 shows a high-level call flow sequence diagram of an exemplary embodiment using activation of OI-8 to provide efficient cost routing with automatically assigned variable hot-line number, in accordance with the principles of the present invention.

FIG. 3 shows a high-level call flow sequence diagram of an exemplary embodiment using activation of OI-8 to provide efficient cost routing with automatically assigned variable hot-line number, in accordance with the principles of the present invention.

In particular, as shown in FIG. 3, along with the hot-line number lookup table 100, the WIN application preferably uses an IS-41 Origination Indicator Single Number feature (OI-8) to instruct the Visiting Location Register (VLR) 222 of the roamed-to service provider to route the incoming call from the mobile device 150 according to the hot-line telephone number determined from a lookup in the hot-line number lookup table 100.

At registration, the WIN platform receives a REGNOT message and saves the Mobile Switching Center Identity (MSCID) and other location information of the mobile device 150. The WIN application uses the MSCID as a search key to obtain a hot-line number from the hot-line number lookup table 100. In the REGNOT return result, the WIN application populates the Destination Digits parameter of the REGNOT message with the hot-line number and sets the associated Origination Indicator parameter with value 8.

In the given embodiment, the HLR 206 does not modify this parameter but rather forwards it in the REGNOT return result to the Mobile Switching Center (MSC) 214. This hot-line number along with the associated Origination Indicator are now stored in the VLR (not shown).

When the subscriber originates a call from the mobile device 150, the call is routed to the WIN platform via the LCN.

(Message 1) The Mobile Station (MS) 150 initiates registration access to the MSC 214 when it moves across a defined boundary, or when it is powered on.

(Message 2) The MSC 214 formulates the MS data including Mobile Identification Number (MIN), the MSCID, Location Area and CellID, and sends the REGNOT message to the HLR 206 carrying this information.

(Message 3) The HLR 206 receiving the REGNOT message, determines that the MS 150 is a WIN subscriber and that this feature is active and so forwards the REGNOT message to the WIN platform, the SCP 202 in this example.

(Message 4) Using the MIN and the MSCID, the WIN application in the SCP 202 searches the database in the hot-line number lookup table 100 and determines that the subsequent calls should be routed to the number NPA-NXX-XXXX, the hot-line number. The WIN application populates this number in the DSTDGT parameter of the REGNOT message. It also sets the Origination Indicator parameter to number 8 before returning the response REGNOT message back to the HLR 206.

(Message 5) The HLR 206 saves the OI-8 information and populates the rest of the profiles for the MS 150 before returning REGNOT message back to the MSC 222.

(Message 6) The MSC 222 allows registration to occur and creates a VLR with OI-8 feature active along with any other features in the profile.

(Message 7) The WIN MS 150 dials a number and presses SEND.

(Message 8) The MSC 222 uses the OI-8 feature to route the call according to the designated NPA-NXX-XXXX to the Intelligent Peripheral (IP).

(Message 9) Call is setup over an LCN.

Preferably, when the subscriber 150 registers in a home network or a network that supports WIN triggers where hot-lining is not required, the WIN application may remove the OI-8 feature using a similar procedure. For instance, FIGS. 4 and 6 demonstrate exemplary embodiments using the removal of the OI-8 feature.

Deactivation of OI-8: Option 1

Figure 4:
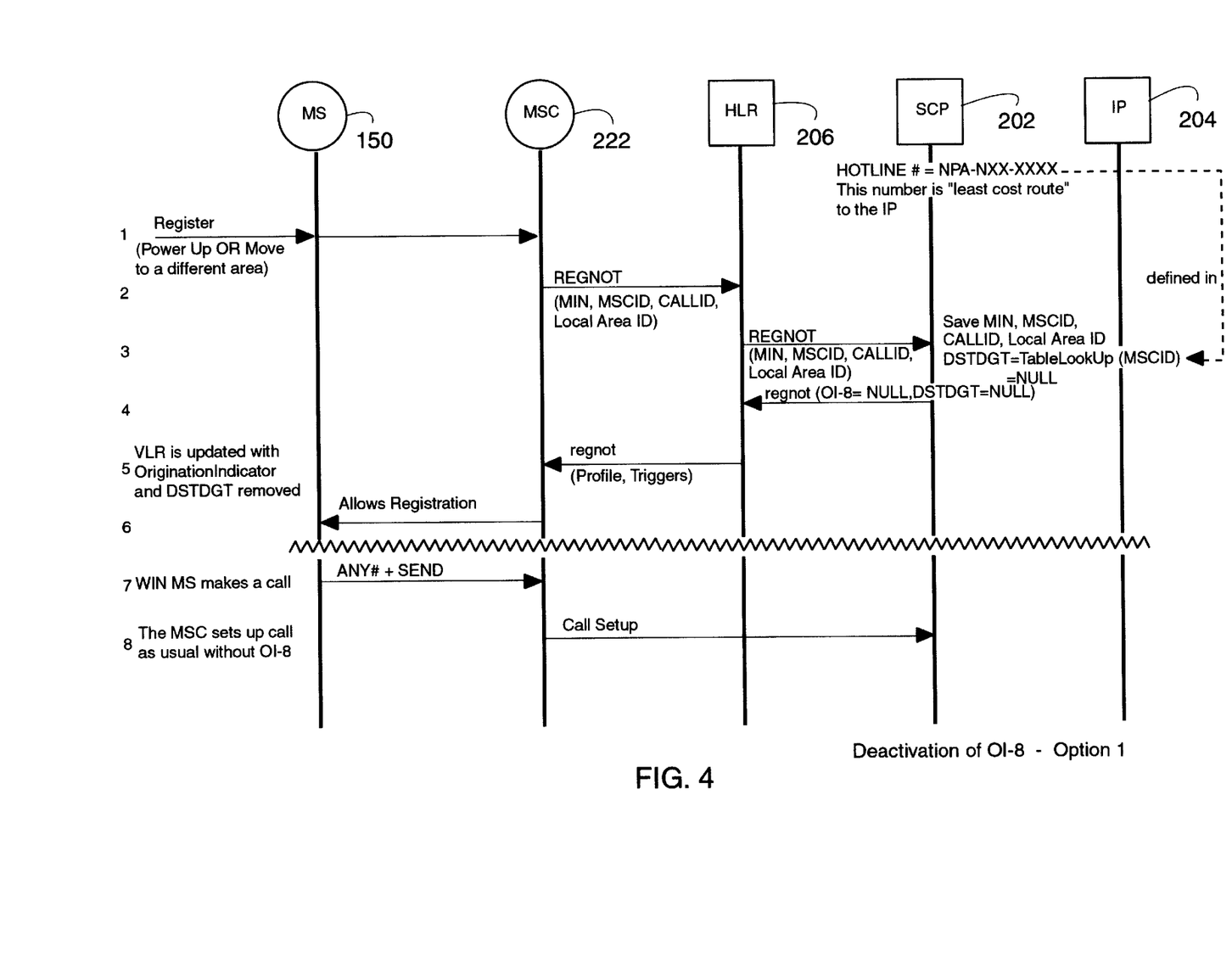
FIG. 4 shows a high-level call flow sequence diagram of an exemplary embodiment using deactivation of OI-8 to provide efficient cost routing with automatically assigned variable hot-line number, in accordance with another aspect of the present invention.

FIG. 4 shows a high-level call flow sequence diagram of an exemplary embodiment using deactivation of OI-8 to provide efficient cost routing with automatically assigned variable hot-line number, in accordance with another aspect of the present invention.

In particular, as shown in FIG. 4, when the MS 150 registers in the Home network or in a network that supports WIN triggers or where hot-lining is not required, the WIN platform will receive another REGNOT message. Before returning the REGNOT response result, the WIN application 202 preferably removes the hot-lining feature, e.g., by resetting the Origination Indicator and Destination Digits values back to their original values. As a result, the VLR of the MS 150 will be populated with the profile without the hot-lining feature active.

(Message 1) The Mobile Station (MS) 150 initiates registration access to the MSC 222 when it moves across a defined boundary, or when it is powered on.

(Message 2) The MSC 222 formulates the required MS data including, e.g., a Mobile Identification Number (MIN), an MSCID, a Location Area and CellID, and sends a REGNOT message to the HLR 206 carrying this information.

(Message 3) The HLR 206 receives the REGNOT message, determines that the MS 150 is a WIN subscriber and that this feature is active, and so forwards the REGNOT message to the WIN platform (the SCP 202 in this example).

(Message 4) Using the MIN and the MSCID, the WIN application in the SCP 202 searches the database in the hot-line number lookup table 100 and determines, e.g., that the subscriber 150 has just moved to a network that does not require hot-lining. Therefore, subsequent calls should be routed as usual, without hot-lining. The WIN application 202 preferably then deactivates the OI-8 feature, e.g., by setting the DSTDGT parameter of the REGNOT message to NULL. The WIN application 202 preferably also resets the Origination Indicator parameter to NULL before returning the response message back to the HLR 206.

(Message 5) The HLR 206 removes the OI-8 feature from the profile, and populates the rest of the profiles for the MS 150 before returning the REGNOT message back to the MSC 222.

(Message 6) The MSC 222 allows registration to occur and creates a VLR without the OI-8 feature while leaving other features active in the profile.

(Message 7) The WIN MS 150 dials a desired telephone number and presses SEND.

(Message 8) The MSC 222 sets up the call without OI-8.

Activation of OI-8: Option 2

Figure 5:
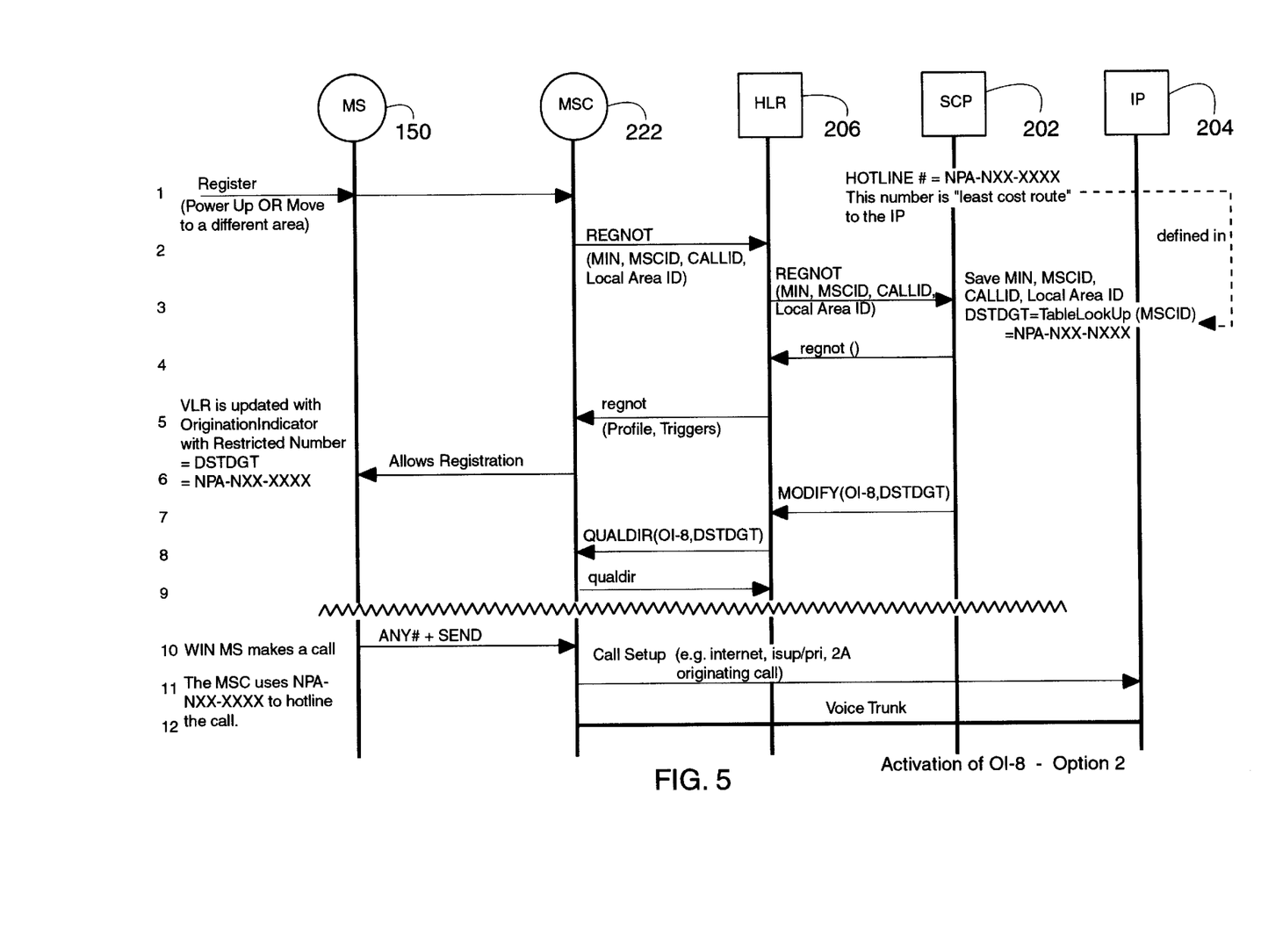
FIG. 5 shows a high-level call flow sequence diagram of another exemplary embodiment using activation of OI-8 to provide efficient cost routing with automatically assigned variable hot-line number, in accordance with the principles of the present invention.

FIG. 5 shows a high-level call flow sequence diagram of another exemplary embodiment using activation of OI-8 to provide efficient cost routing with automatically assigned variable hot-line number, in accordance with the principles of the present invention.

In particular, as shown in FIG. 5, the process is similar to the activation method shown and described with reference to FIG. 3, except that after the reception of REGNOT in the WIN platform 202, the WIN application 202 returns the REGNOT message back to the HLR 222 without any modification. The WIN application 202 then preferably uses a different message, e.g. Search and Modify, over a link such as TCP/IP or SS7 to update the subscriber profile with the OI-8 feature. As a result, the HLR 206 sends an IS-41 Qualification Directive (QUALDIR) message to the VLR to update the hot-line feature.

(Message 1) The Mobile Station (MS) 150 initiates registration access to the MSC 222 when it moves across a defined boundary, or when it is powered on.

(Message 2) The MSC 222 formulates MS data including a Mobile Identification Number (MIN), an MSCID, a location area and CellID, and sends a REGNOT message to the HLR 206 carrying this information.

(Message 3) The HLR 206 receiving the REGNOT message determines that the MS 150 is a WIN subscriber and that this feature is active, and thus forwards the REGNOT message to the WIN platform (the SCP 202 in this example).

(Message 4) Using the MIN and the MSCID, the WIN application in the SCP 202 searches the database in the hot-line number lookup table 100 and determines that the subsequent calls should be routed to the number NPA-NXX-XXXX, the hot-line number. The WIN application 202 saves this information and returns the REGNOT response message back to the HLR 206.

(Message 5) The HLR 206 populates all needed profiles for the MS 150 and returns the REGNOT message back to the MSC 222.

(Message 6) The MSC 222 allows registration as usual.

(Message 7) The WIN application 202 populates the NPA-NXX-XXXX values and the OI value in a new message, e.g. in a MODIFY message, and sends this message to the HLR 206 to update the subscriber profile with the OI-8 feature.

(Message 8) The HLR 206 updates the MS profile with the OI-8 feature. The profile update causes the HLR 206 to populate the DSTDGT and the OI-8 parameters in a QUALDIR message to be sent to the MSC 222.

(Message 9) The MSC 222 acknowledges the profile update with the QUALDIR message.

(Message 10) The WIN MS 150 dials a number and presses SEND.

(Message 11) The MSC 222 uses the OI-8 feature to route the call according to the designated NPA-NXX-XXXX to the Intelligent Peripheral (IP).

(Message 12) Call is setup over an LCN 216.

Deactivation of OI-8: Option 2

Figure 6:
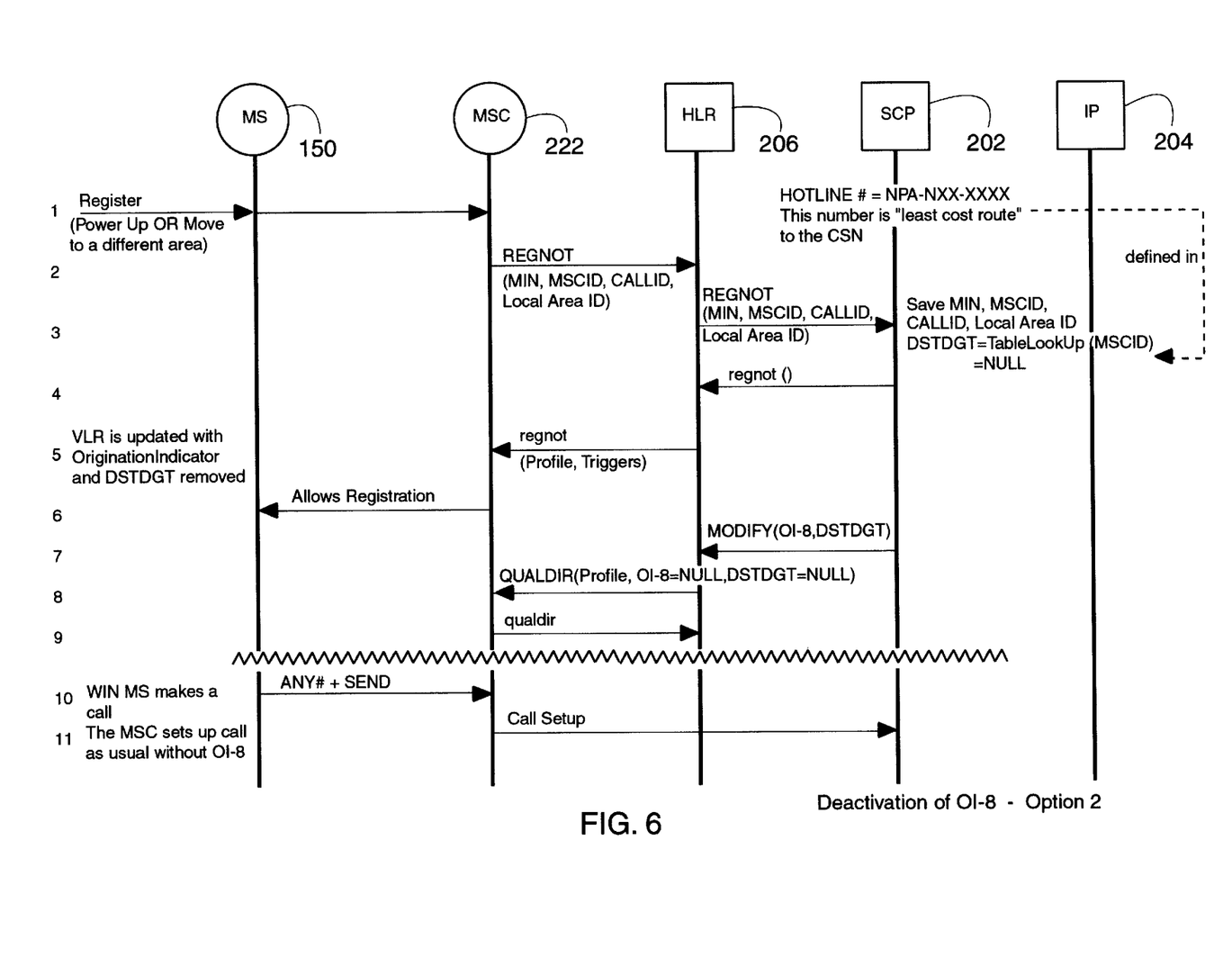
FIG. 6 shows a high-level call flow sequence diagram of another exemplary embodiment using deactivation of OI-8 to provide efficient cost routing with automatically assigned variable hot-line number, in accordance with another aspect of the present invention.

FIG. 6 shows a high-level call flow sequence diagram of another exemplary embodiment using deactivation of OI-8 to provide efficient cost routing with automatically assigned variable hot-line number, in accordance with another aspect of the present invention.

In particular, as shown in FIG. 6, when the WIN MS subscriber 150 registers in a network that does not require hot-lining, the following sequences occur.

(Message 1) The Mobile Station (MS) 150 initiates registration access to the MSC 222 when it moves across a defined boundary, or when it is powered on.

(Message 2) The MSC 222 formulates MS data including a Mobile Identification Number (MIN), an MSCID, a location area and CellID, and sends a REGNOT message to the HLR 206 carrying this information.

(Message 3) The HLR 206 receiving the REGNOT message determines that the MS 150 is a WIN subscriber and that this feature is active, and thus forwards the REGNOT message to the WIN platform (the SCP 202 in this example).

(Message 4) Using the MIN and the MSCID, the WIN application in the SCP 202 searches the database in the hot-line number lookup table 100 and determines that subsequent calls should be routed without the use of the OI-8 feature. The WIN application saves this information and returns the response message back to the HLR 206.

(Message 5) The HLR 206 populates all needed profiles for the MS 150 and returns the REGNOT message back to the MSC 222.

(Message 6) The MSC 222 allows registration as usual.

(Message 7) The WIN application 202 resets the NPA-NXX-XXXX and the OI-8 value to NULL in a new message, e.g. in a MODIFY message, and sends this message to the HLR 206 to update the subscriber profile to remove the OI-8 feature.

(Message 8) The HLR 206 removes the OI-8 feature from the MS profile. The profile update causes the HLR 206 to populate the DSTDGT and OI-8 parameters to NULL in the QUALDIR message to be send to the MSC 222.

(Message 9) The MSC 222 acknowledges the profile update with QUALDIR.

(Message 10) The WIN MS 150 dials a number and presses SEND.

(Message 11) The MSC 222 sets up the call as usual, without OI-8 feature.

While the invention has been described with reference to the exemplary embodiments thereof, those skilled in the art will be able to make various modifications to the described embodiments of the invention without departing from the true spirit and scope of the invention.

What is claimed is:

1. In a wireless intelligent network (WIN), a WIN application including a hot-line lookup table comprising:
a plurality of entries, each of said plurality of entries associating a service providing mobile switching center ID with at least one particular hot-line telephone number, said at least one hot-line telephone number being a telephone number a mobile device is routed to irregardless of a number dialed by said mobile device;
wherein said service providing mobile switching center is associated with a roaming mobile station visiting a mobile switching center in said wireless intelligent network.

2. In the wireless intelligent network (WIN) according to claim 1, wherein:
a service providing mobile switching center identified by said service providing mobile switching center ID is in a wireless intelligent network different from the wireless intelligent network including the visited mobile switching center.

3. In the wireless intelligent network (WIN) according to claim 1, wherein:
said WIN application resides in a service control point.

4. In the wireless intelligent network (WIN) according to claim 1, wherein at least one of said plurality of entries in said hot-line lookup table further comprises:
a plurality of different hot-line numbers; and
an association between each of said different hot-line numbers and at least one other parameter.

5. In the wireless intelligent network (WIN) according to claim 4, wherein said at least one other parameter comprises:
a time of day.

6. A method of automatically assigning one of a plurality of hot-line numbers to an incoming call from a roaming mobile device, comprising:
forwarding a registration notification (REGNOT) message from a home location register associated with said roaming mobile device;

retrieving a unique identification of a home wireless intelligent network of said roaming mobile device; and selecting one of a plurality of different hot-line numbers based on a match to said unique identification of said home wireless intelligent network, a hot-line telephone number being a telephone number a mobile device is routed to irregardless of a number dialed by said roaming mobile device.

7. The method of automatically assigning one of a plurality of hot-line numbers to an incoming call from a roaming mobile device according to claim 6, wherein:

said REGNOT message is forwarded to an application running on a wireless intelligent network (WIN) platform.

8. The method of automatically assigning one of a plurality of hot-line numbers to an incoming call from a roaming mobile device according to claim 6, wherein:

said associating is performed in a visiting WIN.

9. The method of automatically assigning one of a plurality of hot-line numbers to an incoming call from a roaming mobile device according to claim 6, wherein:

said unique identification of a home wireless intelligent network relates to an identity of a mobile switching center.

10. The method of automatically assigning one of a plurality of hot-line numbers to an incoming call from a roaming mobile device according to claim 9, wherein:

said unique identification is an MSCID.

11. Apparatus for automatically assigning one of a plurality of hot-line numbers to an incoming call from a roaming mobile device, comprising:

means for forwarding a REGNOT message from a home location register associated with said roaming mobile device;

means for retrieving a unique identification of a home wireless intelligent network of said roaming mobile device; and means for selecting one of a plurality of different hot-line numbers based on a match to said unique identification of said home wireless intelligent network, a hot-line telephone number being a telephone number a mobile device is routed to irregardless of a number dialed by said roaming mobile device.

12. The apparatus for automatically assigning one of a plurality of hot-line numbers to an incoming call from a roaming mobile device according to claim 11, wherein:

said means for forwarding performs said associating in a visiting WIN.

13. The apparatus for automatically assigning one of a plurality of hot-line numbers to an incoming call from a roaming mobile device according to claim 11, wherein:

said unique identification of a home wireless intelligent network relates to an identity of a mobile switching center.

14. The apparatus for automatically assigning one of a plurality of hot-line numbers to an incoming call from a roaming mobile device according to claim 13, wherein:

said unique identification is an MSCID.

* * * * *